(12) United States Patent
Ishikawa et al.

(10) Patent No.: US 7,748,596 B2
(45) Date of Patent: Jul. 6, 2010

(54) WELDED STRUCTURE HAVING EXCELLENT RESISTANCE TO BRITTLE CRACK PROPAGATION AND WELDING METHOD THEREFOR

(75) Inventors: Tadashi Ishikawa, Futtsu (JP); Takehiro Inoue, Futtsu (JP); Hiroshi Shimanuki, Futtsu (JP); Tadashi Koseki, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 313 days.

(21) Appl. No.: 11/486,661

(22) Filed: Jul. 13, 2006

(65) Prior Publication Data

US 2007/0040001 A1 Feb. 22, 2007

Related U.S. Application Data

(63) Continuation-in-part of application No. 10/572,828, filed as application No. PCT/JP2004/015202 on Oct. 7, 2004.

(30) Foreign Application Priority Data

Oct. 8, 2003 (JP) ............................. 2003-349284
Oct. 5, 2004 (JP) ............................. 2004-292028

(51) Int. Cl.
*B23K 31/02* (2006.01)
*B23K 31/00* (2006.01)

(52) U.S. Cl. ...................................... 228/119

(58) Field of Classification Search .................. 228/119
See application file for complete search history.

(56) References Cited

U.S. PATENT DOCUMENTS

| 4,857,697 A * | 8/1989 | Melville ................. 219/121.63 |
| 6,085,528 A * | 7/2000 | Woodall et al. .............. 62/45.1 |
| 2004/0069831 A1* | 4/2004 | O'Donnell et al. .......... 228/104 |

FOREIGN PATENT DOCUMENTS

| JP | 54-11405 | 1/1979 |
| JP | 55-122678 | 9/1980 |
| JP | 57-4395 | 1/1982 |
| JP | 60-245768 | 12/1985 |
| JP | 06-88161 | 3/1994 |

* cited by examiner

*Primary Examiner*—Jessica L. Ward
*Assistant Examiner*—Nicholas P D'Aniello
(74) *Attorney, Agent, or Firm*—Kenyon & Kenyon LLP (57) ABSTRACT

A welding method for manufacturing welded structures having excellent properties to prevent the propagation of brittle fracture occurring in welded joints, characterized by the step of forming a repair weld having a greater toughness than that of a butt weld and an outer edge whose angle φ with respect to the longitudinal direction of the butt weld is not less than 10 degrees and not more than 60 degrees, by applying repair welding to a region to arrest a brittle crack in a butt-welded joint where a brittle crack is likely to propagate after removing part of the butt-welded joint, in said region, by gouging or machining.

6 Claims, 4 Drawing Sheets

W: WIDTH OF REPAIR WELDING $\theta \leq 45°$
$t/10 \leq d \leq t/3$

Fig.6

PLATE THICKNESS

WELDED STRUCTURE HAVING EXCELLENT RESISTANCE TO BRITTLE CRACK PROPAGATION AND WELDING METHOD THEREFOR

This application is a continuation-in-part application under 35 U.S.C. §120 of prior application Ser. No. 10/572,828 filed Mar. 21, 2006 which is a 35 U.S.C. §371 of International Application No. PCT/JP2004/015202 filed Oct. 7, 2004, wherein PCT/JP2004/015202 was filed and published in the Japanese language.

TECHNICAL FIELD

The present invention relates to welded structures, having excellent resistance to brittle crack propagation, that prevent the propagation of brittle cracks developed in welded joints and to welding methods providing such welded structures.

More concretely, the present invention relates to welding methods providing welded structures, having excellent resistance to brittle crack propagation, that prevent the propagation of brittle cracks, that might occur in welded joints of welded structures formed by applying large-heat-input welding to steel plates, and to technologies to enhance the safety of buildings, civil engineering steel and other structures.

BACKGROUND ART

Welding is indispensable for the construction of steel structures and large-heat-input welding is extensively applied to cut down construction cost and increase construction efficiency. Particularly, as steel plate thicknesses increase, the time required for welding increases greatly and, therefore, the need to perform welding with the maximum large-heat-input also increases.

However, application of large-heat-input welding lowers the toughness of the heat-affected zone (HAZ), increases the width of the HAZ and, as a result, lowers the toughness against brittle fracture.

Because of this, steels which are resistant to a drop in the fracture toughness in the HAZ even when large-heat-input welding is applied were invented as disclosed, for example, in Japanese Unexamined Patent Publication (Kokai) Nos. 06-88161 and 60-245768.

Having improved fracture toughness or greater resistance to brittle fracture, the steels according to the above inventions seldom undergo brittle fracture under ordinary service conditions. If, however, a brittle fracture occurs in an earthquakes or other accident and disasters like a collision between structures, there are risks that brittle fractures propagate through the HAZ and cause massive fractures.

It has conventionally been considered that, with TMCP steel plates of approximately 25 mm in thickness, brittle fracture diverts from welded joints to the base metal because of the residual stress in the weld zone. Therefore, it has been considered that brittle cracks occurring in welded joints would be stopped in the base metal so long as the base metal has adequate crack arrestability.

With the upsizing of steel structures, thicker steel plates have come to be used. Because the use of thicker plates is conducive to structure simplification too, high tensile strength steel plates offering high design stresses are finding increasing use.

The full-size breakdown test conducted by the inventors by using an 8000-ton large-sized tester revealed that brittle cracks developed in thicker steel plates of the type described above propagate along the heat-affected zone of welded joints without diverting to the base metal.

Figure 1:
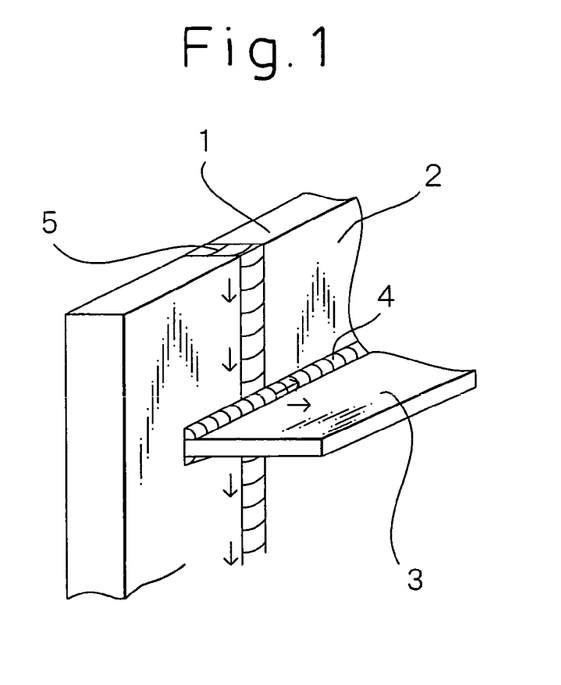
FIG. 1 shows a welded structure with a stiffener.

In the brittle fracture test conducted by the inventors, a stiffener (reinforcement) 3 fillet-welded to a steel plate 1, not greater than 50 mm in thickness, so as to intersect a butt-welded joint thereof as shown in FIG. 1 often arrested the propagation of brittle crack developed in the steel plate 1 and thereby prevented the fracture thereof.

In thicker plates, such as those, for example, exceeding 50 mm and reaching approximately 70 mm in thickness, brittle cracks sometimes propagated along the HAZ or weld metal without diverting to the base metal despite the provision of the stiffener 3.

SUMMARY OF THE INVENTION

The object of the present invention is to provide welded structures that prevent fatal fracture thereof by preventing the propagation of brittle cracks that occur in welded joints at repair welds and methods for manufacturing such welded structures.

The inventors completed the present invention based on a finding that application of specific welding to welded structures prevents the propagation of brittle cracks that occur in welded joints and can often lead to large-scale fracture.

The gist of the present invention is as described below.

(1) A welding method for manufacturing welded structures having excellent properties to prevent the propagation of brittle fracture occurring in welded joints, characterized by the step of forming a repair weld having a greater toughness than that of a butt weld and an outer edge whose angle φ, with respect to the longitudinal direction of the butt weld, is not less than 10 degrees and not more than 60 degrees, by applying repair welding to a region to arrest a brittle crack in a butt-welded joint where a brittle crack is likely to propagate.

(2) The welding method for manufacturing welded structures having excellent properties to prevent the propagation of brittle fracture described in (1) above, in which the toughness in said repair weld is at least 20 ° C. lower than the brittle-to-ductile fracture transition temperature vTrs of the butt-welded joint.

(3) The welding method for manufacturing welded structures having excellent properties to prevent the propagation of brittle fracture described in (1) or (2) above, in which said repair weld is provided by applying repair welding to the pertinent region after removing ½ or more of plate thickness from either or both sides of the butt-welded joint by gouging or machining.

(4) The welding method for manufacturing welded structures having excellent properties to prevent the propagation of brittle fracture described in any of (1) to (3) above, in which compressive residual stress not less than ½ of the yield stress of the welded member is developed in a direction perpendicular to the longitudinal direction of the butt weld in a region where said repair weld and butt-welded joint are in contact.

(5) The welding method for manufacturing welded structures having excellent properties to prevent the propagation of brittle fracture described in any of (1) to (4) above, in which repair welding is applied by controlling so that the angle θ of the longitudinal direction of at least the last layer of the repair weld bead with respect to the longitudinal direction of the butt weld is not greater than 80 degrees.

(6) The welding method for manufacturing welded structures having excellent properties to prevent the propagation of brittle fracture described in any of (1) to (5) above, in which repair welding is applied by controlling so that the angle φ of the outer edge of the butt weld with respect to the longitudinal direction of the butt weld is not less than 10 degrees and not more than 45 degrees.

(7) A welded structure having excellent properties to prevent the propagation of brittle fracture occurring in welded joints, characterized by that the welded structure has a repair weld having a greater toughness than that of a butt weld and an outer edge whose angle φ with respect to the longitudinal direction of the butt weld is not less than 10 degrees and not more than 60 degrees in a region to arrest a brittle crack in butt-welded joints where a brittle crack is likely to propagate.

(8) The welded structure having excellent properties to prevent the propagation of brittle fracture as described in (7) above, in which the toughness in said repair weld is at least 20° C. lower than the brittle-to-ductile fracture transition temperature vTrs of the butt-welded joint.

(9) The welded structure having excellent properties to prevent the propagation of brittle fracture as described in (7) or (8) above, in which said repair weld is provided by applying repair welding to the pertinent region after removing ½ or more of plate thickness from either or both sides of the butt-welded joint by gouging or machining.

(10) The welded structure having excellent properties to prevent the propagation of brittle fracture as described in any of (7) to (9) above, in which compressive residual stress not less than ½ of the yield stress of the welded member is developed in a direction perpendicular to the longitudinal direction of the butt weld in a region where said repair weld and butt-welded joint are in contact.

(11) The welded structure having excellent properties to prevent the propagation of brittle fracture as described in any of (7) to (10) above, in which the angle θ of the longitudinal direction of at least the last layer of the repair weld bead with respect to the longitudinal direction of the butt weld is not greater than 80 degrees.

(12) The welded structure having excellent properties to prevent the propagation of brittle fracture as described in any of (7) to (11) above, in which the angle φ of the outer edge of the butt weld with respect to the longitudinal direction of the butt weld is not less than 10 degrees and not more than 45 degrees.

(13) A repair welding method for manufacturing welded structures having excellent properties to prevent the propagation of brittle fracture occurring in welded joints, characterized by the step of leading the brittle fracture propagating along the butt welded joint away therefrom to the base metal by partially removing part of the butt welded joint in a region where it is desired to arrest brittle fracture that might propagate along the weld, by applying gouging or machining from both surfaces while leaving a core of thickness not less than ¹/₁₀ and not more than ⅓ of the original thickness and then applying to the removed part repair welding with a welding material having excellent fracture toughness.

(14) The welding method for manufacturing welded structures having excellent properties to prevent the propagation of brittle fracture described in (13) above, in which the angle of the edge of said partially removed part with respect to the surface of the steel plate is not more than 45 degrees apart.

(15) The welding method for manufacturing welded structures having excellent properties to prevent the propagation of brittle fracture described in (13) or (14) above, in which the width of said partially removed part at the surface is not smaller than the sum of the width of the weld bead and the thickness of the steel plate.

Thus, the present invention prevents the propagation of brittle cracks that occur in welded joints in welds by applying specific welding to part of butt-welded joints.

THE MOST PREFERRED EMBODIMENT

Details of the best mode for practicing the present invention are described by reference to FIGS. 2 to 6.

Figure 2:
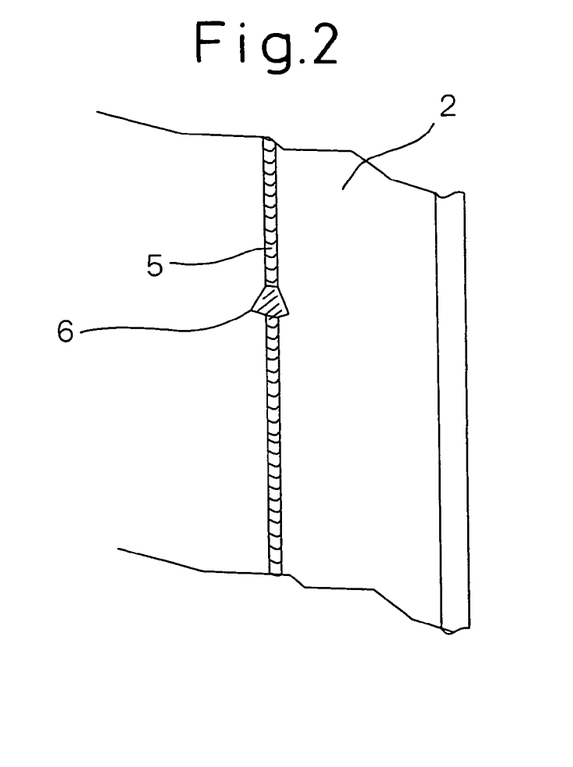
FIG. 2 shows a welded structure with repair welding.

FIG. 2 shows a butt-welded joint of steel plate to which the welding method of the present invention is applied. In FIG. 2, reference numerals 2, 5 and 6 respectively designate a butt-welded joint, a butt weld zone, and a repair weld.

1) The repair weld according to the present invention is a repair weld 6, as shown in FIG. 2, that has a greater toughness than that of a butt weld 5 and an outer edge whose angle φ with respect to the longitudinal direction of the butt weld is not less than 10 degrees and not more than 60 degrees by applying repair welding with a welding material providing excellent toughness to a region to arrest brittle crack in a butt-welded joint 2 (which consists of the butt weld 5 and the heat-affected zone of steel plate 1) where brittle crack is likely to propagate after removing part of the butt-welded joint 2 (which consists of the butt weld 5 and the heat-affected zone of steel plate 1) in said region by gouging or machining.

A brittle crack developed in the butt-welded joint 2 propagates through the butt weld 5 or the heat-affected zone of the steel plate 1 where residual tensile stress is likely to occur. However, it was discovered that the propagation of the brittle crack is arrested by forming a repair weld 6 with a greater toughness than that of the butt weld 5 and an outer edge whose angle φ with respect to the longitudinal direction of the butt weld 5 is not less than 10 degrees and not more than 60 degrees in a region to arrest the brittle crack, thereby diverting the brittle crack from the butt weld 5 or the heat-affected zone of the steel plate 1 to the base metal of the steel plate 1.

When this repair welding is applied to a welded structure consisting of a vertical member (steel plate 1) and a horizontal steel stiffener (reinforcement) 3 intersectingly attached to a butt weld 5 thereon by a fillet weld 4 as shown in FIG. 1, the effect described above is more pronounced because the repair weld 6 prevents the propagation of the brittle crack by diverting it from the butt weld 5 or the heat-affected zone of the steel plate 1 to the steel stiffener (reinforcement) 3.

Even in welded structures having no stiffener (reinforcement) 3 shown in FIG. 1, the repair weld 6 prevents propagation of the brittle crack by diverting it from the butt weld 5 or the heat-affected zone of the steel plate 1 to the steel plate 1. Therefore, the present invention is not limited to the welded structure of the type shown in FIG. 1.

In the present invention, forming said repair weld 6 having excellent toughness after removing ½ or more of plate thickness from either or both sides of the butt-welded joint by gouging or machining favorably arrests the propagation of crack more surely and increases resistance to brittle crack propagation.

In the present invention, the brittle crack that has propagated through the butt weld 5 in the butt-welded joint 2 or the heat-affected zone of the steel plate 1 will pass into the repair weld 6 without diverting to the steel plate 1 or stiffener 3 if, for example, the angle φ of the outer edge with respect to the longitudinal direction of the butt weld is relatively large. If, then, the roughness of the repair weld 6 is lower than that of the butt weld 5, the crack having passed into the repair weld 6 does not stop but, instead, sometimes continues to propagate along the butt weld 5 in the butt-welded joint 2 or the heat-affected zone of the steel plate.

In the present invention, therefor, forming a repair weld 6 with such excellent toughness as at least 20° C. lower than the brittle-to-ductile fracture transition temperature vTrs of butt weld 5 by applying repair welding with a welding material providing excellent fracture toughness is preferable because such repair weld arrests the propagation of crack therein even when the brittle crack having propagated along the butt weld 5 of the butt-welded joint 2 or the heat-affected zone of the steel plate 1 passes into the repair weld 6 without diverting to the steel plate 1 or stiffener 3.

In addition, the method to enhance the fracture toughness of the weld metal in the repair weld 6 is not limited to any particular one. The toughness of the weld metal is controlled to said range of toughness by applying repair welding with welding materials providing excellent toughness such as a welding wire containing not less than Ni of 2 mass %.

Figure 3:
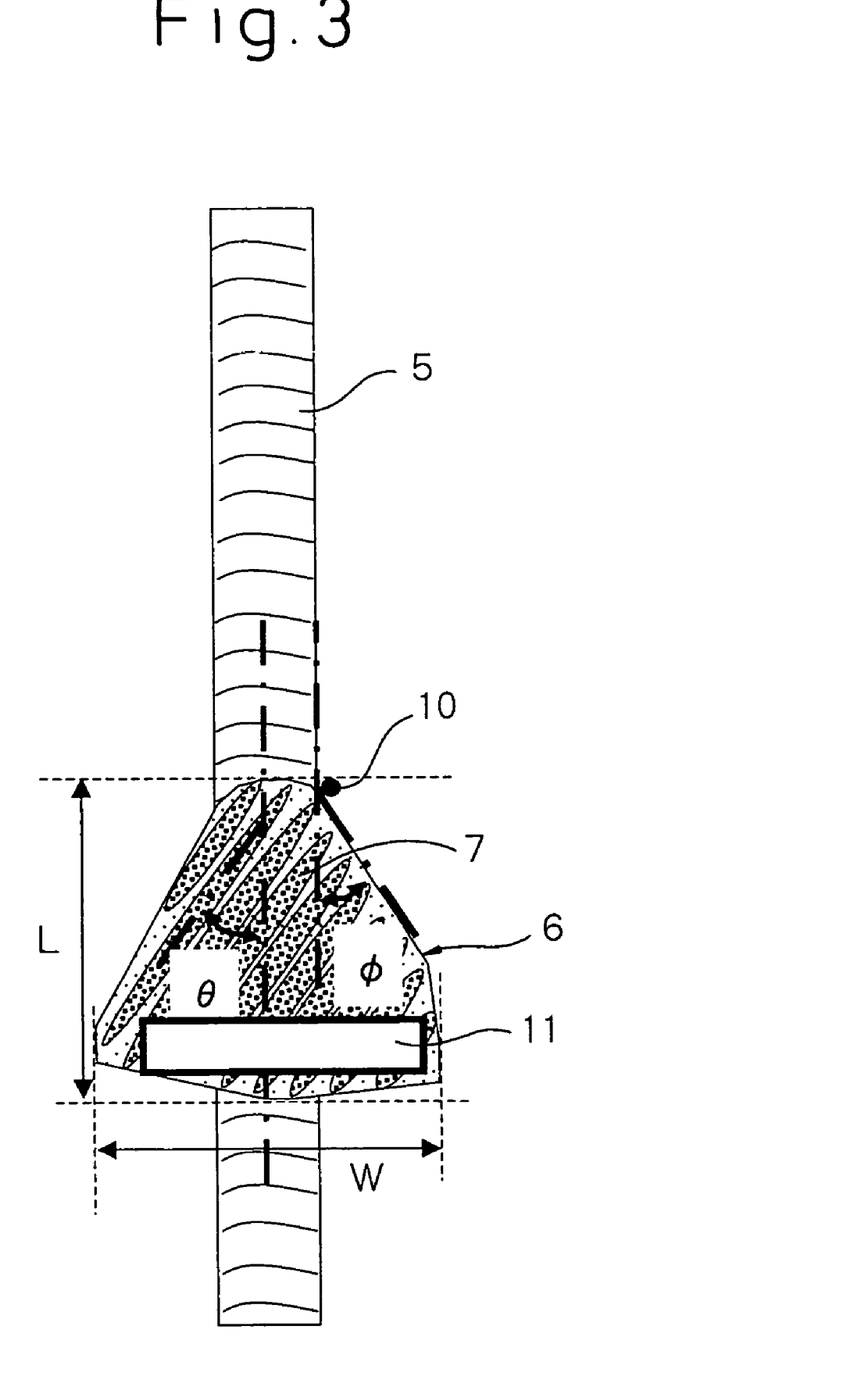
FIG. 3 shows a welding method for welded structures that prevent the propagation of brittle fracture.

FIG. 3 is a detail view of a repair weld made by the welding method of the present invention.

In FIG. 3, reference numerals 2, 5, 6 and 7 respectively designate a butt-welded joint, butt weld, repair weld and weld bead.

The inventors also made various empirical studies about optimum conditions for the repair weld. The studies revealed that forming said repair weld 6 with excellent toughness and making the angle φ of the outer edge thereof with respect to the longitudinal direction of the butt weld not less than 10 degrees and not more than 60 degrees in a region to arrest brittle crack in a butt-welded joint where brittle crack is likely to propagate prevents the propagation of brittle crack in the base steel plate by diverting the brittle crack that would propagate along the butt weld 5 of the heat-affected zone of the steel plate 1 to the steel plate 1 or stiffener 3. Even a brittle crack having entered the repair weld 6 can be surely arrested therein.

The main technical idea of the present invention is to divert the brittle crack that propagates along the longitudinal direction of the butt weld 5, under the influence of the residual stress that occurs in the vicinity of the outer edge of the repair weld 6, that is, in a region where the butt-welded joint 2 and the repair weld 6 meet, from the butt weld 5 in the butt-welded joint 2 or the heat-affected zone of the steel plate 1 to the steel plate 1 or stiffener 3.

The inventors studied the conditions that make it possible to divert the brittle crack propagating through the butt weld 5 in the butt-welded joint 2 or the heat-affected zone of the steel plate to the steel plate 1 or stiffener 3 by varying the angle φ of the outer edge of the repair weld 6 with respect to the longitudinal direction of the butt weld 5.

The study led to a finding that if said angle φ exceeds 60 degrees brittle fracture cannot be arrested unless the fracture toughness of the repair weld 6 is sufficiently high because brittle fracture often passes into the repair weld 6. If said angle φ is less than 60 degrees, brittle fracture propagates along the boundary between the repair weld 6 and butt-welded joint (base metal) and is arrested after being led to the steel plate 1 or stiffener 3.

To get a fuller effect, it is preferable to make the angle φ is the outer edge of the butt weld with respect to the longitudinal direction of the butt weld not greater than 45 degrees.

However, if the angle φ is less than 10 degrees, the brittle crack propagating along the boundary between the repair weld 6 and butt-welded joint 2 (base metal) approaches so close to the butt weld 5 after passing through the region of the repair weld 6 that the brittle crack sometimes re-propagates along the butt weld 5 or the heat-affected zone of the steel plate 1. Therefore, the lower limit of the angle φ is set at 10 degrees.

It was also found that controlling the angle θ of the longitudinal direction of at least the last layer of the repair weld bead 7 in the repair weld 6 with respect to the longitudinal direction of the butt weld 5 creates a large residual stress in a region where the repair weld 6 and butt-welded joint (that is, the heat-affected zone of the steel plate 1) meet. By thus changing the direction of the principal stress in the same region from the direction of the principal stress working on the butt-welded joint 2 (that is, the butt weld 5 and the heat-affected zone of the steel plate 1), the brittle crack propagating along said butt weld 5 in the butt-welded joint 2 or the heat-affected zone of the steel plate 1 can be more stably diverted from the butt weld 5 or the heat-affected zone of the steel plate 1 and guided to the base metal.

Through various experiments the inventors discovered that the residual stress occurring in the region where the repair weld 6 and butt-welded joint 2 meet is greatly affected by the angle θ of the longitudinal direction of at least the last layer of the repair weld bead 7 in the repair weld 6 with respect to the longitudinal direction of the butt weld 5.

When solidifying, the repair weld bead 7 tends to shrink more in the longitudinal direction thereof, while the matrix of the butt-welded joint (that is, the heat-affected zone of the steel plate 1) near the end of the repair weld bead 7 does not deform much. As a consequence, residual stress occurs near the end of the repair weld bead 7.

Although a repair weld 6 having a large thickness is made by multi-pass welding, the residual stress having occurred near the end of the last layer of the repair weld bead 7 remains unaffected because no more pass will heat the last layer of the repair weld bead 7.

In order to create a great residual stress in the region where the repair weld 6 and butt-welded joint 2 meet, it was discovered that the angle θ of the longitudinal direction of at least the last layer of the repair weld bead 7 in the repair weld 6 with respect to the longitudinal direction of the butt weld 5 plays an important role.

If said angle θ exceeds 80 degrees, the longitudinal direction of the repair weld bead 7 approaches the direction that is perpendicular to the longitudinal direction of the butt weld 5 and, thus, agrees with or approaches the direction of the principal component of the tensile residual stress that occurs when the bead solidifies and shrinks and causes the crack to propagate. Therefore, the brittle crack that has propagated along the fusion line (FL) cannot be diverted to the vicinity of the repair weld.

It is therefore preferable to make the angle θ of at least the last layer of the repair weld bead 7 in the repair weld 6 with respect to the longitudinal direction of the butt weld 6 not greater than 80 degrees.

It is preferable that the angle θ approaches 0 degree and the direction of the tensile residual stress occurring at the end of the repair weld bead 7 becomes perpendicular to the direction of the principal stress that causes the crack to propagate because the resultant of the directions works to arrest the rectilinear propagation of the crack and thereby enhances the effect of to divert the crack to the vicinity of the repair weld.

In order to create as great a residual stress as possible by forming a repair weld bead 7 in the repair weld 6, it is desirable to keep the temperature difference between the repair weld bead 7 and the vicinity of the repair weld bead 7.

If the repair welding is performed with a large heat input, the temperature in the vicinity of the repair weld bead 7 rises greatly, with the result that the repair weld bead 7 takes longer time to cool to approximately room temperature and the residual stress decreases. In order to raise the residual stress, a smaller heat input is more advantageous.

2) In order to arrest the propagation of brittle fracture, another repair welding method of the present invention removes part of the butt welded joint 5 that is likely to propagate a brittle fracture in the region where a brittle fracture should be arrested, as shown in FIG. 2, by applying gouging or machining and then repair welding with a welding material having excellent fracture toughness.

Although the brittle fracture started in the welded joint propagates through the butt welded joint 5, propagation to a region where brittle fracture should be arrested can be prevented by increasing the toughness in the region by removing part of the butt welded joint in the region by gouging or machining and then applying repair welding with a welding material having excellent fracture toughness.

Figure 5:
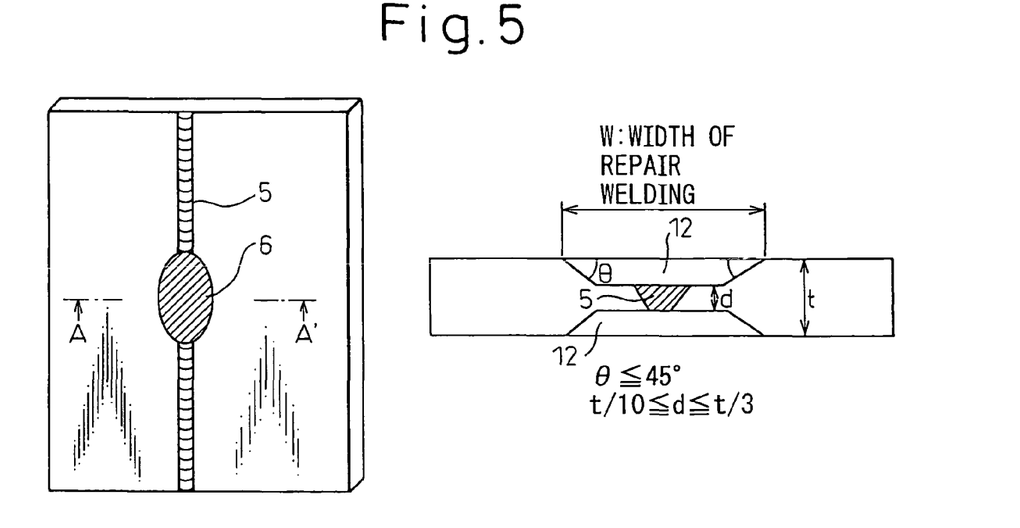
FIG. 5 shows another welding method for welded structures that prevent the propagation of brittle fracture.
Figure 6:
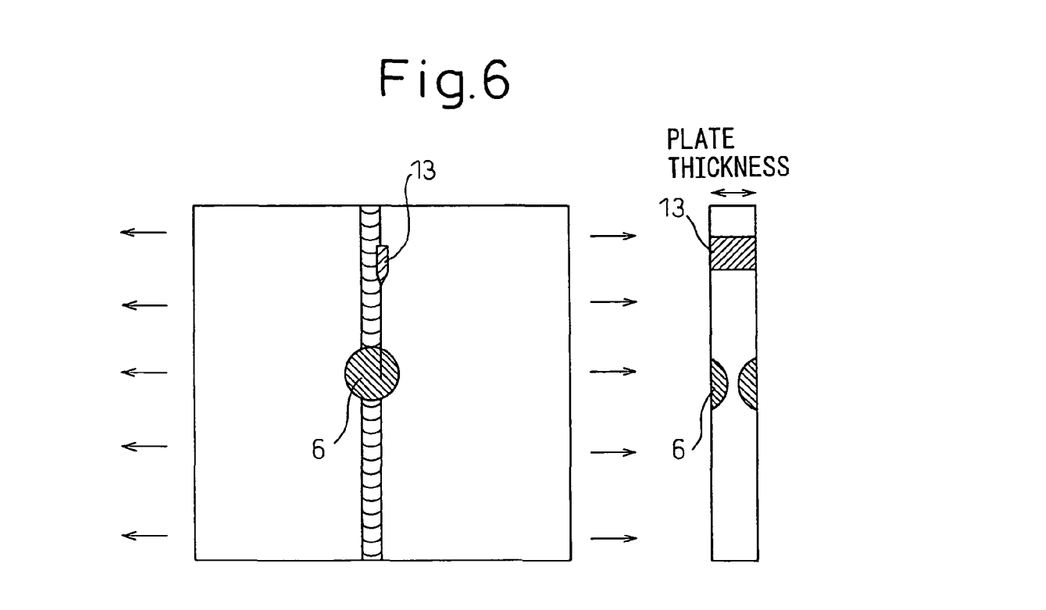
FIG. 6 shows a test specimen used in another example of the present invention.

FIG. 5 shows details of a part repaired by the welding method of the present invention, in which reference numerals 5, 6 and 12 designate a butt welded part, a repair welded part and a part removed in the welded part.

By changing the shape of the removed part 12 in the butt welded part 5 where brittle fracture is likely to propagate, the inventors discovered that propagation of brittle fracture is prevented more effectively when some portion of thickness (designated by d in FIG. 5) is left unremoved in the removed part 12.

This is because leaving not less than $1/10$ and not more than $1/3$ of thickness in the central region of thickness permits locating the position of brittle fracture propagation in the fine-grained heat-affected zone of the base metal that is in the center of the thickness thereof.

Leaving some portion of thickness unremoved prevents burn-through of weld metal to the back side in repair welding, thereby increasing the efficiency of welding and enhancing the properties of the welded joint. By comparing removing from one side with that from both sides, the inventors discovered that removing from both sides creates a greater effect on the prevention of brittle fracture propagation.

ASTM STP905 (1986), pp. 22-40 (Kiyoshi Tanaka, et. al., "A New Wide Plate Arrest Test (SCA Test) on Weld Joints of Steel for Low Temperature Application") discloses a phenomenon similar to the one described above.

That is to say, the disclosure compares the ability to arrest the propagation of brittle fracture in the weld between the V groove weld welded from one side and the X groove weld welded from both sides by using the steel plate and welding material of the same qualities and shows that the X groove weld welded from both sides has a greater ability to arrest the propagation of brittle fracture.

Furthermore, the inventors discovered through various experiments that the angle between the edge of the removed part and the surface of the steel plate has a great influence on the ability of the welded joint to arrest the propagation of brittle fracture. This is considered to be due to the fact that brittle fracture has a tendency to propagate along a path perpendicular to the direction of principal stress and, therefore, the path of fracture in the welded joint with inclined groove has a tendency to partially divert toward the base metal.

For example, if the same steel plate and welding material of the same quality are used, it is known that the V and X groove welds, whose weld lines are inclined with respect to the direction of the normal to the surface of the steel plate, have a greater ability to arrest the propagation of brittle fracture than the ⌴ and K groove welds whose weld lines agree with the direction of the normal to the surface of the steel plate. This is considered to be due to the fact that increasing the area of brittle fractured surface increases the energy required to propagate a brittle fracture and thereby increases the resistance to propagation.

As the result of experiments, the inventors discovered that brittle fracture can be diverted to the base metal by increasing the ability to arrest the propagation of brittle fracture in the weld if the angle between the edge of the removed part and the surface of the steel plate is kept at 45 degrees or under.

EXAMPLE 1

This example relates to the invention described in 1) above.

Various tests were conducted to determine if repair welds made after removing part of butt-welded joints by gouging have abilities to arrest the propagation of brittle cracks.

The tests were done to evaluate the abilities to arrest the rectilinear propagation of brittle cracks along the longitudinal direction of the butt weld. Test specimens were prepared by using steel plates, 2,500 mm square and having various thicknesses, and machining a dent having a depth approximately equal to half the thickness and a diameter approximately equal to the thickness on each side of the specimen. Then, weld metals of various compositions and structures were made in said dents by using welding materials of various compositions under various welding conditions as listed in Tables 1 to 4.

Figure 4:
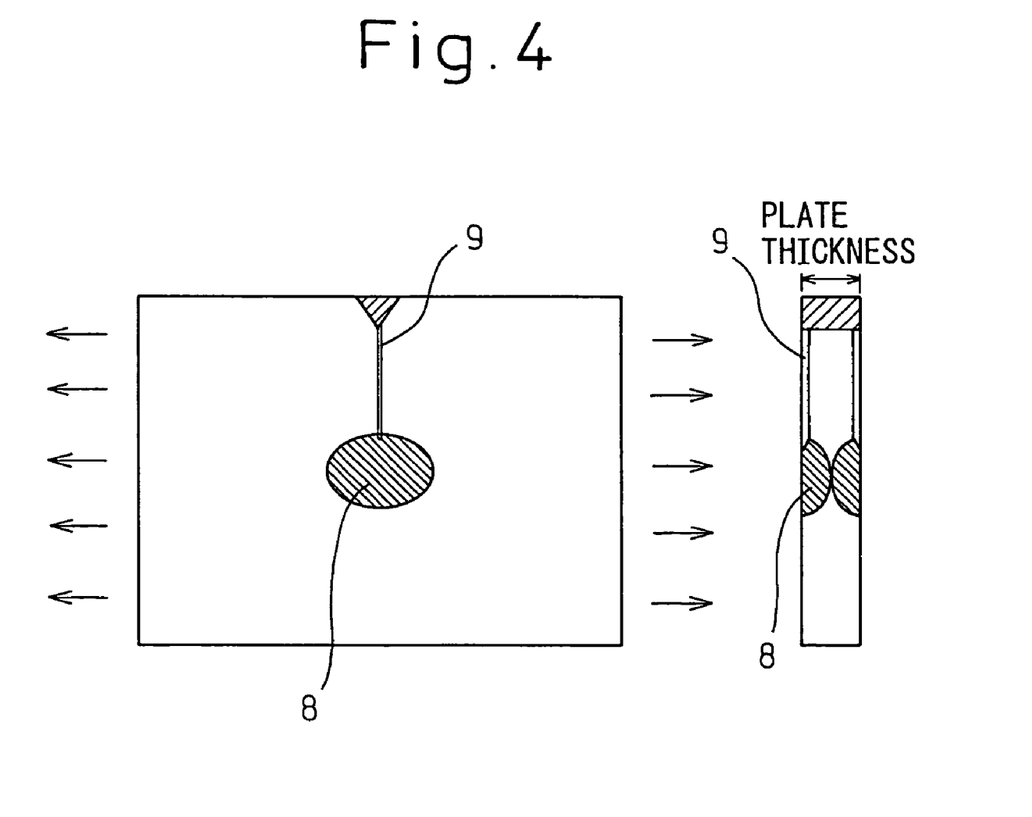
FIG. 4 shows a test specimen taken from an embodiment of the present invention.

Then a V-notch cut to create a brittle crack by forcing in a wedge 8 was made so as to agree with the fusion line of the butt weld (that is, a large-heat-input welded joint by electro gas welding) at a point 200 mm away from the edge of each test specimen. The temperature at the center of the test specimen was controlled to $-10°$ C. by cooling the edge thereof to approximately $-40°$ C. After applying a given stress, the wedge was driven in to said V-notch cut to create a brittle crack that was then allowed to propagate along the fusion line of the butt weld.

After the propagated brittle crack reached the repair weld, whether the same brittle crack propagates further or not was evaluated.

Table 1 shows the results.

The toughness of the weld metal in the butt and repair welds were determined by taking specimens so that the longitudinal direction thereof is perpendicular to the longitudinal direction of the butt weld, applying a V-notch Charpy impact test to each specimen, and finding the brittle-to-ductile fracture transition temperature vTrs (° C.). The differences in vTrs (° C.) between the repair and butt welds shown in Table 1 are the differences thus determined.

The residual stress in the vicinity of the repair weld was determined by x-ray radioscopy at a point 2 mm closer to the welded base metal from a point where the outer edges of the repair and butt welds meet (that is, the point 11 where the Charpy test specimen was taken, as indicated by ● in FIG. 3).

The direction of the determined residual stress is perpendicular to the longitudinal direction of the butt weld and equal to the direction of the principal stress along which brittle crack propagates along the butt weld or the heat-affected zone of the steel plate.

The residual stresses (MPa) in the repair weld shown in Table 1 are the residual stresses thus determined, with the negative sign – designates compressive stress and the positive sign + designates tensile stress.

The point of brittle crack propagation shown in Table 1 means the point at which the crack developed at the edge of the test specimen propagates to the repair weld. FL (fusion line) indicates that the crack propagated along the fusion line of the repair weld and WM (weld metal) indicates that the crack propagated through the weld metal of the repair weld.

In the description of the resistance to brittle crack propagation in Table 1, "Diverted to and arrested in the base metal" means that the crack diverted to outside the repair weld region and became arrested in the base metal, without causing fracture and "Propagated after entering the weld metal (WM) and through the butt weld again" means that the crack that has entered and propagated through the weld metal continues to propagate through the butt weld, thereby causing fracture.

"Propagated again through the butt weld after propagating along the repair weld" means that the crack guided to the vicinity of the repair weld propagated through the repair weld and then along the butt weld again.

"(Part of the crack branched and became arrested in the repair weld)" means that the crack branched and entered the repair weld because the residual stress in the region where the repair and butt welds intersect was not sufficiently compressive, though the principal component of the crack was diverted and arrested in the base metal. The repair weld was partly damaged but did not lead to fracture because the main component of the crack was diverted to the base metal.

Test specimens Nos. 1 to 13 were examples of the present invention to which repair welding was applied after removing part of the butt-welded joint according to the method of the present invention. All specimens showed good resistance to crack propagation.

In test specimens Nos. 11, 12 and 13, residual stress did not reach the predetermined level because said angle θ was too great. Although part of the crack, therefore, branched to the repair weld, the principal component of the crack was diverted to and arrested in the base metal.

Test specimens Nos. 14 to 21 are for the purpose of comparison. In test specimens Nos. 14 to 17, repair welding was done after removing part of the butt-welded joint. However, cracks entered and passed through the repair weld without being arrested therein, propagated along the butt weld again, and caused fracture because toughness differed little between the repair and butt welds and the toughness in the repair weld was low.

In test specimen No. 18, the value of the angle φ was too small though the repair weld had adequate toughness. Therefore, crack propagated along the repair weld and, then, propagated through the butt weld again and caused fracture.

In test specimens Nos. 19 to 21, part of the butt-welded joint was not removed before applying repair welding. Therefore, the brittle crack created in the butt-welded joint propagated therealong and broke the specimen into exactly two halves.

TABLE 1

| | No. | Butt-welded Joint | | | | | Repair Weld | | | |
|---|---|---|---|---|---|---|---|---|---|---|
| | | Type of Steel | Plate Thickness (mm) | Welding Method | Welding Material | Removing Method | Width, W (mm) | Length, L (mm) | Total Depth (mm) | |
| Examples of the Invention | 1 | YP40 | 50 | EG | EG-1 | Gouging | 115 | 138 | 40 | |
| | 2 | YP47 | 45 | EG | EG-60 | Machining | 80 | 96 | 25 | |
| | 3 | YP32 | 35 | EG | EG-1 | Gouging | 70 | 84 | 35 | |
| | 4 | YP36 | 25 | EG | EG-3 | Gouging | 60 | 72 | 20 | |
| | 5 | YP40 | 50 | EG | EG-3 | Machining | 115 | 138 | 25 | |
| | 6 | YP40 | 60 | EG | EG-3 | Gouging | 140 | 168 | 40 | |
| | 7 | YP40 | 35 | CO2 | YM26 | Gouging | 80 | 96 | 20 | |
| | 8 | YP47 | 70 | VEGA-II | EG-60M | Machining | 150 | 180 | 50 | |
| | 9 | YP32 | 40 | SAW | Y-Dx NB250H | Gouging | 90 | 108 | 25 | |
| | 10 | YP40 | 80 | VEGA-II | EG-60M | Gouging | 150 | 180 | 50 | |
| | 11 | YP36 | 20 | FAB | Y-Dx NB250H | Gouging | 50 | 60 | 10 | |
| | 12 | YP40 | 45 | SAW | Y-DMx NSH55E | Machining | 100 | 120 | 35 | |
| | 13 | YP47 | 100 | VEGA-II | EG-60M | Gouging | 200 | 240 | 80 | |
| Examples for Comparison | 14 | YP40 | 50 | EG | EG-3 | Gouging | 90 | 100 | 30 | |
| | 15 | YP47 | 30 | FCB | Y-DMx NSH55E | Gouging | 70 | 100 | 20 | |
| | 16 | YP32 | 45 | EG | EG-1 | Machining | 90 | 100 | 25 | |
| | 17 | YP47 | 31 | FCB | Y-DMx NSH55E | Gouging | 70 | 100 | 20 | |
| | 18 | YP40 | 25 | FCB | Y-DMx NSH55E | Machining | 100 | 90 | 25 | |
| | 19 | YP36 | 65 | VEGA | EG-60M | None | — | — | 0 | |
| | 20 | YP40 | 70 | SEG | DWS-1LG | None | — | — | 0 | |
| | 21 | YP40 | 60 | VEGA-II | EG-60M | None | — | — | 0 | |

| | No. | Repair Weld | | | | | | |
|---|---|---|---|---|---|---|---|---|
| | | Welding Method | Welding Material | vTrs Difference between Repair and Butt Welds | Angle φ (Degree) | Angle θ (Degree) | Layer to Control Angle θ | Heat Input, HI (kJ/mm) |
| Examples of the Invention | 1 | CO2 welding | YM55H | −20 | 12 | 0 | All layers | 2.5 |
| | 2 | SMAW | N-12 | −32 | 43 | 60 | Last layer | 2 |
| | 3 | CO2 welding | YM-3N | −40 | 15 | 45 | Last layer | 2.5 |
| | 4 | CO2 welding | YM-1N | −30 | 20 | 35 | Last layer | 3 |

TABLE 1-continued

|  | | No. | Method | Welding Material | (MPa) | | | Layers | |
|---|---|---|---|---|---|---|---|---|---|
| | | 5 | SMAW | YAWATA WELD B | −150 | 30 | 55 | All layers | 2.5 |
| | | 6 | CO₂ welding | YM36E | −25 | 45 | 45 | All layers | 5 |
| | | 7 | CO₂ welding | YM55H | −28 | 10 | 45 | Last and preceding 3 layers | 2 |
| | | 8 | SMAW | YAWATA WELD B (M) | −180 | 35 | 40 | Last and preceding 4 layers | 2.9 |
| | | 9 | CO₂ welding | YM309L | −160 | 42 | 30 | Last layer | 5 |
| | | 10 | CO₂ welding | YM309L | −100 | 55 | 45 | All layers | — |
| | | 11 | CO₂ welding | YM316L | −140 | 40 | 85 | Last layer | 2.8 |
| | | 12 | SMAW | YAWATA WELD B (M) | −175 | 45 | 82 | Last layer | 2.3 |
| | | 13 | SMAW | YM-3N | −45 | 60 | 90 | All layers | — |
| Examples for Comparison | | 14 | CO₂ welding | YM28 | −10 | 0 | 30 | Last layer | 3.5 |
| | | 15 | SMAW | L-60 | 40 | 45 | 90 | All layers | 3.5 |
| | | 16 | CO₂ welding | YM28 | −5 | 80 | 45 | All layers | 1.5 |
| | | 17 | SMAW | L-60 | 5 | 40 | 30 | All layers | 2.1 |
| | | 18 | CO₂ welding | YM28 | −25 | 5 | 80 | Last layer | 2.3 |
| | | 19 | — | | | | | None | — |
| | | 20 | — | | | | | None | — |
| | | 21 | — | | | | | None | — |

| | | Resistance to Crack Propagation | | |
|---|---|---|---|---|
| | No. | Residual Stress in Repair Weld (MPa) | Propagation Point in Repair Weld | Results |
| Examples of the Invention | 1 | −350 | FL | Diverted to and arrested in the base metal |
| | 2 | −402 | FL | Diverted to and arrested in the base metal |
| | 3 | −265 | FL | Diverted to and arrested in the base metal |
| | 1 | −300 | FL | Diverted to and arrested in the base metal |
| | 5 | −340 | FL | Diverted to and arrested in the base metal |
| | 6 | −300 | FL | Diverted to and arrested in the base metal |
| | 7 | −320 | FL | Diverted to and arrested in the base metal |
| | 8 | −420 | FL | Diverted to and arrested in the base metal |
| | 9 | −300 | FL | Diverted to and arrested in the base metal |
| | 10 | −200 | FL | Diverted to and arrested in the base metal |
| | 11 | 100 | FL(WM) | Diverted to and arrested in the base metal (Part of the crack branched and became arrested in the repair weld) |
| | 12 | 120 | FL(WM) | Diverted to and arrested in the base metal (Part of the crack branched and became arrested in the repair weld) |
| | 13 | 300 | FL(WM) | Diverted to and arrested in the base metal (Part of the crack branched and became arrested in the repair weld) |
| Examples for Comparison | 14 | 100 | WM | Propagated again through the butt weld after propagating along the repair weld |
| | 15 | −200 | WM | Propagated after entering the weld metal (WM) and through the butt weld again |
| | 16 | 300 | WM | Propagated after entering the weld metal (WM) and through the butt weld again |
| | 17 | −250 | WM | Propagated after entering the weld metal (WM) and through the butt weld again |
| | 18 | 120 | WM | Propagated again through the butt weld after propagating along the repair weld |
| | 19 | — | — | Propagated through the butt weld |
| | 20 | — | — | Propagated through the butt weld |
| | 21 | — | — | Propagated through the butt weld |

EG: Electro gas arc welding,
CO₂: Carbon dioxide gas shield arc welding,
SAW: Submerged arc welding,
FCB: Copper backing one-side submerged arc welding,
FAB: Asbestos backing one-side submerged arc welding,
VEGA: One-electrode oscillating electro gas welding,
VEGA-II: Two-electrode oscillating electro gas welding,
SEG: Simplified electro gas welding,
SMAW: Manual welding (Covered arc welding)

TABLE 2

Chemical compositions of steels (mass %)

| Type of Steel | C | Si | Mn | P | S | Ni | Ti |
|---|---|---|---|---|---|---|---|
| YP32 | 0.13 | 0.19 | 1.28 | 0.01 | 0.003 | — | 0.01 |
| YP36 | 0.12 | 0.21 | 1.27 | 0.007 | 0.004 | — | 0.01 |
| YP40 | 0.11 | 0.21 | 1.3 | 0.006 | 0.003 | — | 0.01 |
| YP47 | 0.08 | 0.24 | 1.22 | 0.007 | 0.002 | 1.02 | 0.01 |

TABLE 3

Chemical compositions of welding materials in butt-welds (mass %)

| Welding Material | C | Si | Mn | P | S | Mo | Ni |
|---|---|---|---|---|---|---|---|
| EG-1 | 0.1 | 0.33 | 1.45 | 0.015 | 0.01 | 0.27 | — |
| EG-3 | 0.08 | 0.29 | 1.85 | 0.011 | 0.008 | 0.2 | — |
| EG-60 | 0.1 | 0.34 | 1.68 | 0.016 | 0.015 | 0.29 | — |
| EG-60M | 0.07 | 0.29 | 1.81 | 0.011 | 0.01 | 0.4 | 1.5 |
| YM26 | 0.1 | 0.52 | 1.11 | 0.017 | 0.011 | — | — |
| Y-Dx NB250H | 0.07 | 0.24 | 1.38 | 0.014 | 0.009 | — | — |
| Y-DMx NSH55E | 0.1 | 0.25 | 1.40 | 0.014 | 0.009 | 0.36 | — |
| DWS-1LG | 0.06 | 0.20 | 1.51 | 0.015 | 0.01 | — | 2.0 |

TABLE 4

Chemical compositions of welding materials in repair welds (mass %)

| Welding Material | C | Si | Mn | P | S | Mo | Ni | Cr |
|---|---|---|---|---|---|---|---|---|
| YM36E | 0.05 | 0.33 | 1.2 | 0.004 | 0.002 | — | — | — |
| YM55H | 0.08 | 0.44 | 1.36 | 0.006 | 0.002 | 0.18 | — | — |
| YM60C | 0.07 | 0.38 | 1.38 | 0.005 | 0.012 | 0.35 | — | — |
| YM-1N | 0.05 | 0.39 | 1.25 | 0.007 | 0.005 | 0.22 | 0.98 | — |
| YM-3N | 0.04 | 0.3 | 0.7 | 0.006 | 0.004 | — | 3.56 | — |
| YAWATA WELD B | 0.06 | 0.3 | 2.91 | 0.008 | 0.004 | 0.76 | 68.5 | 16.7 |
| YAWATA WELD B (M) | 0.09 | 0.24 | 3.27 | 0.008 | 0.003 | 2.32 | 65.1 | 15 |
| YM309L | 0.022 | 0.47 | 1.52 | 0.02 | 0.007 | — | 13.1 | 24.1 |
| YM316L | 0.015 | 0.49 | 1.32 | 0.02 | 0.007 | 2.59 | 12.8 | 18.9 |
| N-12 | 0.06 | 0.44 | 1.02 | 0.002 | 0.005 | — | 2.38 | — |
| N-13 | 0.05 | 0.42 | 0.46 | 0.01 | 0.008 | — | 3.35 | — |
| N-16 | 0.04 | 0.17 | 0.28 | 0.01 | 0.05 | — | 6.65 | — |
| L-60 | 0.07 | 0.48 | 1.12 | 0.01 | 0.06 | 0.22 | 0.76 | — |

TABLE 5

| | NO. | Butt-welded Joint Type of Steel | Plate Thickness (mm) | Welding Method | Repair Welding Removing Method | Width (mm) | Welding Method | Angle of Removal (°) | Unremoved Thickness (mm) | HI (kJ/mm) | Crack Propagation Position | Result | Arrested Position |
|---|---|---|---|---|---|---|---|---|---|---|---|---|---|
| Examples of the Invention | 1 | YP40 | 50 | EG | Gouging | 58 | $CO_2$ welding | 30 | 5 | 2.5 | FL | Arrested | Base metal |
| | 2 | YP32 | 40 | EG | Machining | 67 | $CO_2$ welding | 40 | 4 | 2.2 | WM | Arrested | Base metal |
| | 3 | YP36 | 25 | EG | Gouging | 56 | $CO_2$ welding | 40 | 2.5 | 2.8 | FL | Arrested | Base metal |
| | 4 | SM570 | 45 | EG | Gouging | 63 | SMAW | 35 | 4.5 | 2.2 | FL | Arrested | Base metal |
| | 5 | YP40 | 35 | $CO_2$ | Gouging | 53 | $CO_2$ welding | 30 | 3.5 | 3 | FL | Arrested | Base metal |
| | 6 | HT80 | 45 | FCB | Gouging | 49 | SMAW | 25 | 4.5 | 2.9 | WM | Arrested | Base metal |
| | 7 | YP32 | 40 | SAW | Gouging | 67 | $CO_2$ welding | 40 | 4 | 4 | FL | Arrested | Base metal |
| | 8 | YP36 | 20 | FAB | Gouging | 47 | $CO_2$ welding | 35 | 2 | 4.2 | FL | Arrested | Base metal |
| | 9 | YP40 | 45 | SAW | Gouging | 75 | SMAW | 45 | 4.5 | 2.8 | FL | Arrested | Base metal |
| | 10 | YP40 | 65 | VEGA-II | Gouging | 77 | $CO_2$ welding | 40 | 6.5 | 3.2 | WM | Arrested | Base metal |
| | 11 | HT80 | 80 | VEGA-II | Machining | 88 | SMAW | 45 | 8 | 2.8 | FL | Arrested | Base metal |
| Examples for Comparison | 12 | YP40 | 50 | EG | Gouging | 90 | $CO_2$ welding | 60 | — | 2.8 | FL | Propagated | — |
| | 13 | YP40 | 25 | FCB | Machining | 100 | $CO_2$ welding | 80 | — | 2.3 | FL | Propagated | — |
| | 14 | HT80 | 45 | FCB | Gouging | 60 | SMAW | 40 | — | 2.5 | WM | Propagated | — |
| | 15 | YP32 | 40 | EG | Machining | 80 | SMAW | 30 | — | 2.5 | WM | Propagated | — |
| | 16 | YP36 | 65 | VEGA | None | — | — | — | — | — | WM | Propagated | — |

TABLE 5-continued

| | Butt-welded Joint | | | | | | Repair Welding | | | | |
|---|---|---|---|---|---|---|---|---|---|---|---|
| | | Plate | | | | | Angle | Unremoved | | Crack Propagation | |
| NO. | Type of Steel | Thickness (mm) | Welding Method | Removing Method | Width (mm) | Welding Method | of Removal (°) | Thickness (mm) | HI (kJ/mm) | Propagation Position Result | Arrested Position |
| 17 | YP40 | 65 | VEGA-II | None | — | — | | | — | WM Propagated | — |

EXAMPLE 2

This example relates to the invention described in 2) above.

Part of the butt welded joint was removed by gouging and other methods and repair welding was applied to the removed region. Then, various tests were conducted to determine if the repair welded part has an ability to arrest the propagation of brittle fracture.

In order to evaluate the ability to arrest the brittle fracture propagating in a straight line, test specimens were prepared by removing the central part of a 2500 mm square steel plate by applying gouging or machining and then applying repair welding.

Then, a wedge was driven at a point 200 mm away from the edge of the test specimen to form a V-shaped notch to generate brittle fracture so as to agree with the fusion line of the butt welded joint (a weld made with large-heat-input by electro-gas welding).

Next, the edge of the specimen was cooled to approximately −40° C. and the center thereof was controlled to −10° C. After applying a predetermined stress, a wedge was driven into the V-shaped notch 13 to generate a brittle fracture that was then allowed to propagate along the fusion line of the butt welded joint.

After the propagated brittle fracture reached the added weld, whether the brittle fracture propagates further or not was evaluated.

Table 5 shows examples of the present invention. Nos. 1 to 11 are the examples of the present invention to which repair welding was applied after removing the weld. All examples exhibited good abilities to arrest the propagation of brittle fracture.

In Table 5, FL (Fusion Line) in the column of propagation position shows that crack propagated along the fusion line, Arrested in the column of result shows that crack was arrested in the repair welded region, and Base Metal in the column of arrested position shows that crack propagated in the repair welded region and stopped in the base metal, without causing fracture.

Nos. 12 to 17 are examples for comparison. In Nos. 14 to 17, the weld was removed and repair welding was applied. Nevertheless, a crack propagated because the unremoved thickness d, the angle of the removed part θ and the width of the removed part W were outside the scope of the present invention. In Nos. 12 and 13, a crack propagated along the fusion line because the unremoved thickness was 0 and the angle of the removed part was large.

In Nos. 14 and 15, a crack propagated to the weld metal because the unremoved thickness was 0 and the removed width was too small. In Nos. 16 and 17, the brittle fracture started in the butt welded joint propagated along therealong and the specimens broke into two halves because the weld was not removed and repair welding was not applied.

INDUSTRIAL APPLICABILITY

As described earlier, the present invention prevents the propagation of brittle cracks in the weld, even when such cracks have occurred in welded joints, by applying specific repair welding to part of butt-welded joints.

The present invention, which thus provides welding methods for welded structures capable of preventing fatal fractures thereof, has remarkable industrial advantages.

The invention claimed is:

1. A welded structure comprising steel plates having excellent properties to prevent the propagation of brittle fracture parallel to the surface of the steel plates in a weld direction of a butt weld of welded joints, characterized by the welded structure includes a repair weld over the butt weld having a greater toughness than that of the butt weld and that an angle φ of an outer edge of the repair weld with respect to the weld direction of the butt weld parallel to the surface of the steel plates is not less than 10 degrees and not more than 60 degrees in a region to arrest brittle fracture in the butt weld in the weld direction of the butt weld parallel to the surface of the steel plates in butt-welded joints of steel plates, said steel plates having a thickness of 20 mm or more
wherein the repair weld does not extend the entire length of the butt weld and wherein the angle φ does not intersect the surface of the plates or the butt weld.

2. The weld structure having excellent properties to prevent the propagation of brittle fracture as described in claim 1, in which the toughness in said repair weld is at least 20° C. lower than the brittle-to-ductile fracture transition temperature vTrs of the butt-welded joint.

3. The welded structure having excellent properties to prevent the propagation of brittle fracture as described in claim 1 or 2, in which said repair weld is provided by applying repair welding to the pertinent region after removing ½ or more of plate thickness from either or both sides of the butt-welded joint by gouging or machining.

4. The welded structure having excellent properties to prevent the propagation of brittle fracture as described in claim 1 or 2, in which compressive residual stress not less than ½ of the yield stress of the welded member is developed in a direction perpendicular to the butt weld in the weld direction parallel to the surface of the steel plates on the surface of steel plates in a region where said repair weld and butt-welded joint are in contact.

5. The welded structure having excellent properties to prevent the propagation of brittle fracture as described in claim 1 or 2 in which the angle θ of at least the last layer of the repair weld bead in the weld direction of the repair weld parallel to the surface of the steel plates with respect to the weld direction of the butt weld on the surface of steel plates is not greater than 80 degrees.

6. The welded structure having excellent properties to prevent the propagation of brittle fracture as described in claim 1 or 2, in which the angle $\phi$ of the outer edge of the butt weld with respect to the weld direction of the butt weld parallel to the surface of the steel plates is not less than 10 degrees and not more than 45 degrees.

* * * * *

UNITED STATES PATENT AND TRADEMARK OFFICE
CERTIFICATE OF CORRECTION

PATENT NO. : 7,748,596 B2
APPLICATION NO. : 11/486661
DATED : July 6, 2010
INVENTOR(S) : Ishikawa et al.

It is certified that error appears in the above-identified patent and that said Letters Patent is hereby corrected as shown below:

Column 17, line 6, change "the angle φ of the outer edge of the butt weld" to -- the angle φ of the outer edge of the repair weld --.

Signed and Sealed this
Twenty-first Day of June, 2011

David J. Kappos
*Director of the United States Patent and Trademark Office*